July 15, 1924.
F. WAGNER
AUTOMOBILE FENDER
Filed Dec. 15, 1923
1,501,154
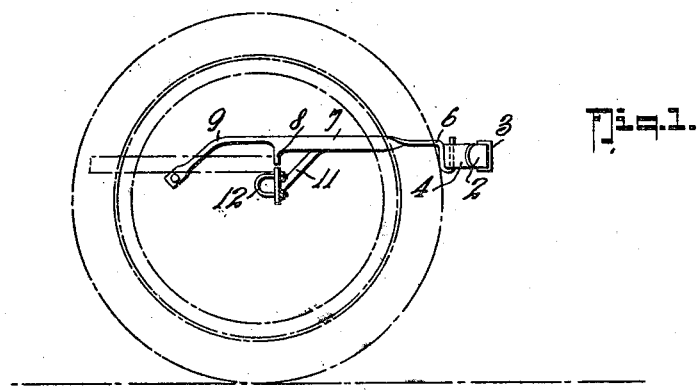
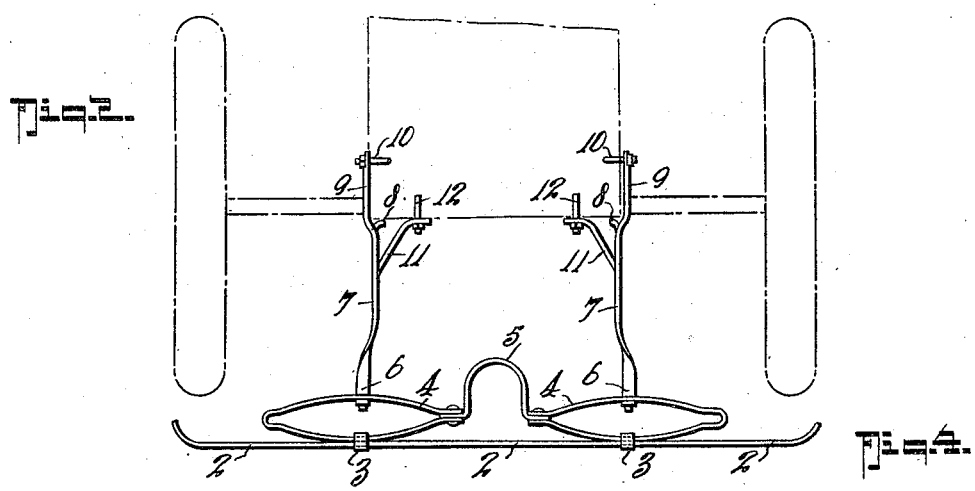
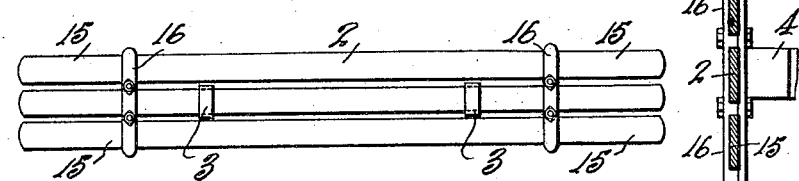
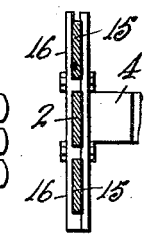
Inventor
Frank Wagner.
By Albert E. Dietrich
Attorney Patented July 15, 1924.

1,501,154

UNITED STATES PATENT OFFICE.

FRANK WAGNER, OF VANCOUVER, BRITISH COLUMBIA, CANADA.

AUTOMOBILE FENDER.

Application filed December 15, 1923. Serial No. 680,917.

*To all whom it may concern:*

Be it known that I, FRANK WAGNER, citizen of the Dominion of Canada, residing at Vancouver, in the Province of British Columbia, Canada, have invented certain new and useful Improvements in Automobile Fenders, of which the following is a specification.

This invention relates to an automobile fender or bumper which has been particularly designed to provide the required strength and elasticity with a simple construction and with a minimum weight of material.

As usually made the front rail or bar of the fender is relatively rigid and the required elasticity is provided by the intervention of springs in its connection to the chassis of the car.

In the fender, which is the subject of this application, the front bar is of flat spring steel having a measure of elasticity in itself and is connected to the chassis of the car through the intervention of two substantially elliptic springs, the inner ends of which are connected together by a U-shaped spring which reinforces the resilience of both the bar and the elliptic springs in somewhat the manner of a truss.

The particular construction of this fender and the advantages thereof are fully set forth in the following specification, reference being made to the drawings by which it is accompanied, in which:

Fig. 1 is a side elevation showing its connection to the chassis of a car.

Fig. 2, a plan of the same.

Fig. 3 is a front elevation showing a modification, and

Fig. 4 is a cross section of the same.

In these drawings 2 represents the front bar of the fender, which is of thin, flat, resilient material, the ends of which, just beyond the width of the wheels, are bent backward in the usual manner.

To this bar 2, at approximately one-quarter of its length from each end, is secured, preferably by a clasp 3, a substantially elliptic spring 4, bent from one piece of thin, flat material, which may be slightly less in cross section than the bar 2. The open ends of these springs 4 are turned toward one another and between them is connected a U-spring 5 of similar material, the bend of the U being turned backward.

The structure so far described constitutes the fender, which is secured to the chassis of the car in any suitable manner that will admit full play of the bar 2 and of the springs 4 and U-spring 5.

The front bar 2 is itself yieldable within the limit of its elasticity, both beyond and intermediate its connection to the elliptic springs 4, and pressure applied to the bar at these connections, is directly supported by the springs 4.

The convex curvature imposed on the bar 2, as when pressure is applied to either end and the concave curvature as when pressure is applied to the middle, tends to shorten the distance between the clips 3 and this shortening tendency is resisted by the interposed U-shaped spring 5, which thereby supports the front rail 2 in its resistance.

The U-shaped spring 5 also resists extension of the ends of the springs 4 toward one another, when compressed, so that this spring 5 performs an important function in supporting the resilience of both the bar 2 and the elliptic springs 4.

The fender is removably connected to the outwardly projecting ends 6 of brackets 7 secured to the front end of the vehicle frame, the end 6 of each bracket being bent downward and upward to receive the thickness of the spring 4 and provided with a set screw to retain it. Each bracket 7 abuts at 8 against the end of the frame and extends at 9 along the outer side of the same where it is secured by a hook bolt 10 which engages the lower flange of the channel of which the frame is made. It has also a downward and inward projection 11 which is attached by a stirrup bolt 12 to the cross rail of the front end of the car frame.

When desired the front rail 2 may have supplementary parallel rails 15 above and below the rail 2 which are secured together and to the rail 2 by clips 16, as shown in Figs. 3 and 4.

I do not desire to be confined to the particular manner here described and illustrated for attaching the fender to the car frame, as the same may be varied within wide limits to suit the requirements of the different cars.

I am aware that elliptic springs have been interposed between the front rail of a fender and the attachment to the car frame, and that front rails have been of flexible, resilient material though not in combination with elliptic springs, but regard the novel feature of the invention to reside in the connection of the elliptic springs together whereby the flexible resistance of the fender as a whole is reinforced.

Having now particularly described my invention, I hereby declare that what I claim as new and desire to be protected in by Letters Patent, is:

1. An automobile fender, comprising the combination with a flexible resilient front bar, elliptic springs connected to the rear side of the bar, a spring secured to the adjacent ends of the elliptic springs and connecting them together, and means for removably connecting the after sides of the elliptic springs to the chassis of the car.

2. An automobile fender, comprising the combination with a flexible resilient front bar, elliptic springs connected to the rear side of the bar, resilient means secured to the adjacent ends of the elliptic springs for connecting the inner ends of the elliptic springs together, and means for removably connecting the after sides of the elliptic springs to the chassis of the car.

3. An automobile fender, comprising the combination with a flexible resilient front bar, elliptic springs each bent from one piece connected to the rear side of the bar, the open ends of said springs being directed toward and connected to one another, and means for connecting the after sides of said springs to the chassis of the car.

4. An automobile fender comprising the combination with a flexible resilient front bar, elliptic springs connected to the rear side of the bar, means for removably connecting the after sides of said springs to the chassis of the car, and a U-shaped spring having its ends secured to the adjacent ends of the elliptic springs, substantially as shown and described.

In testimony whereof I affix my signature.

FRANK WAGNER.